United States Patent [19]
Ollivier

[11] 3,973,579
[45] Aug. 10, 1976

[54] APPARATUS FOR CONTROLLING THE RATIO OF FLOW OF TWO GASES

[75] Inventor: Louis A. Ollivier, Palo Alto, Calif.
[73] Assignee: Veriflo Corporation, Richmond, Calif.
[22] Filed: June 6, 1974
[21] Appl. No.: 476,956

[52] U.S. Cl. .............................. 137/100; 251/122; 251/276
[51] Int. Cl.² ......................................... G05D 11/03
[58] Field of Search ............... 137/98, 100; 138/46; 251/61.2, 61.3, 61.4, 61.5, 122, 276, 278; 92/100, 98 R, 99, 102, 103 R, 103 SD

[56] References Cited
UNITED STATES PATENTS

| | | | |
|---|---|---|---|
| 552,803 | 1/1896 | Williams | 92/100 X |
| 1,290,513 | 1/1919 | Collins et al. | 137/100 X |
| 1,573,079 | 2/1926 | McKee | 137/98 X |
| 2,009,102 | 7/1935 | Bern | 251/61.2 X |
| 2,537,347 | 1/1951 | Hieger et al. | 92/100 X |
| 2,637,690 | 5/1953 | Everson | 137/100 |
| 2,661,023 | 12/1953 | Griswold | 92/100 X |
| 2,873,173 | 2/1959 | Neumeyer | 137/100 X |
| 3,254,662 | 6/1966 | Wagner | 92/100 X |
| 3,322,142 | 5/1967 | Baumann | 251/61.4 |
| 3,371,699 | 3/1968 | Riot | 137/98 X |

FOREIGN PATENTS OR APPLICATIONS

| | | | |
|---|---|---|---|
| 887,751 | 8/1953 | Germany | 251/278 |
| 957,348 | 1/1957 | Germany | 251/278 |

*Primary Examiner*—Robert G. Nilson
*Attorney, Agent, or Firm*—Owen, Wickersham & Erickson

[57] ABSTRACT

Apparatus for controlling the flow ratio of two gases, such as carbon dioxide and air or oxygen, where the principal gas is subject to flow fluctuations and the second gas is added to it at a ratio which is to be kept constant despite the variations in flow of the first gas. From the upstream side of a fixed orifice in a main conduit, the first gas is conducted to a sealed chamber on one side of a very flexible diaphragm. The second gas is conducted to the other side of the diaphragm which serves, in conjunction with a valve controlled by the diaphragm, to equate the pressure of the second gas exactly to that of the first gas. An outlet from the pressure regulator leads to the inlet of a flow control valve, and the outlet of the flow control valve leads back to the main conduit to a point downstream from the fixed orifice. The flow control valve has a tapered metering stem which is movable relative to a stationary passage; adjustment means enables manually setting the position of the flow control stem relative to the passage.

5 Claims, 2 Drawing Figures

APPARATUS FOR CONTROLLING THE RATIO OF FLOW OF TWO GASES

BACKGROUND OF THE INVENTION

This invention relates to apparatus for controlling the flow ratio of two gases, each having a separate supply. It is particularly useful where a main gas is to constitute more than 95% of the flow and where the second gas is to constitute less than 5% of the flow. A specific example of where the invention has special usefulness is in controlling the carbon dioxide ratio to oxygen for a breathing gas supplied to a ventilator.

Clinical experience indicates that prolonged mechanical ventilation of patients tends to decrease arterial carbon dioxide tension below the normal levels. This condition known as "hypocapnia" may have undesirable effects on arterial oxygen tension, cardiac output, cerebral blood flow, release of oxygen from hemoglobin to the tissues, and other such parameters.

In the prior art the attempts to prevent hypocapnia have relied on increasing the capacity or mechanical dead space in the breathing circuit of the ventilator so that a portion of the carbon dioxide released by the patient during his exhalation was added to the volume of breathing gas delivered by the ventilator during the inspiratory phase. However, it has been found that this prior art system was difficult to adjust properly and did not provide good control of the carbon dioxide tension.

In the present invention a new apparatus enables much more accurate and controlled delivery of a proper amount of carbon dioxide to control the carbon dioxide tension. The apparatus senses the flow of the breathing gas to be delivered to the patient via the ventilator, and it adds to this breathing gas, on an instantaneous basis, a flow of carbon dioxide so that a predetermined percentage of carbon dioxide is automatically maintained in the breathing mixture.

Thus, one object of the invention is to provide a good control of the ratio of carbon dioxide to oxygen in a breathing gas.

Another object of the invention is to enable accurate ratio control between any two gases, especially where one gas is supplied in an amount considerably greater than the other.

Another object of the invention is to improve the control of hypocapnia.

SUMMARY OF THE INVENTION

The ratio controller of this invention senses the main flow of breathing gas or other main gas and adds to it the flow of the secondary gas, such as carbon dioxide. The ratio is set by a control knob having a scale to indicate the amount by the percentage of the mixture which the secondary gas is to constitute. As the breathing gas (for example) flows through the apparatus of this invention it creates a differential pressure across a fixed main metering orifice. A diaphragm assembly is subjected on one side to the pressure of the gas on the upstream side of the orifice and on the other side to carbon dioxide pressure generated by the action of a valve member attached to and operated by the diaphragm assembly. This valve member regulates the flow of carbon dioxide from a carbon dioxide supply. The diaphragm assembly senses any difference between the two pressures and automatically regulates the passage of carbon dioxide through this inlet valve member so that the carbon dioxide pressure is maintained at a level that is precisely equal to the pressure of the main gas at the upstream side of the main orifice. This diaphragm assembly and its associated valve member thus comprise a gas regulator for the carbon dioxide, and this regulator has an outlet for the carbon dioxide.

A metering valve has its inlet connected to the outlet from the regulator, and its outlet is connected to the main breathing gas conduit at a point downstream from the fixed main orifice. By automatic operation, an identical differential pressure is placed (1) across the main orifice and (2) across the metering valve, since their outlets are at the same pressure, and their inlets are at the same pressure. The ratio of the two flows has been determined by the ratio of the areas of passage. Since the cross-sectional area of the main orifice is fixed, the ratio is directly related to the area of the opening at the metering valve.

Thus, in other words, in the apparatus there is a main conduit for the first or main gas, and the fixed orifice is in this main conduit and is small in cross section relative to the remainder of the conduit. A pressure regulator has a diaphragm defining two chambers, the first of which is dead-end or sealed and is connected to the conduit upstream from the fixed orifice. The second chamber has an inlet valve such as controlled by the diaphragm and connected to the supply for the second gas (such as carbon dioxide), and it has an outlet for the second gas at the pressure regulated flow, the pressure being equal to that of the first or main gas in the first chamber. The inlet of a flow control valve or metering valve is connected to the second chamber, and its outlet is connected to the conduit just downstream from the fixed orifice. The metering valve or flow control valve has a passageway, which may be cylindrical, and a tapered metering stem which is movable relatively to the passage. It also has adjustment means for varying the position of the stem; since the stem is tapered, this change is position changes the cross-sectional area through which the flow of the second gas passes and thereby changes the flow ratio of the second gas to the first gas. Calibration is provided A preferred device is able to supply from about zero to 3% of carbon dioxide in the breathing gas mixture, with a repeatability within 0.2% of carbon dioxide.

To enable better operation the second chamber of the diaphragm is preferably provided with a bleed, which is set in the factory to achieve a bleed of about 200 cc. per minute at about 40 psi. The bleed is preferably provided with a silencer.

The diaphragm is made extremely sensitive and is provided substantially without any spring action itself, by having the diaphragm be very limp, very flexible. It may be a very thin fabric and elastomer diaphragm and is exposed to the two gases at an annular area where support is provided for the diaphragm at both of its extreme positions, so that it is protected from overranging and from damage when the pressure on either side is substantially above that of the other side.

The stem of the metering valve may be substantially non-rotating, thereby lessening the factors which contribute to inaccuracy.

Other objects and advantages of the invention will appear from the following description of a preferred embodiment

DESCRIPTION OF A PREFERRED EMBODIMENT

Figure 1:
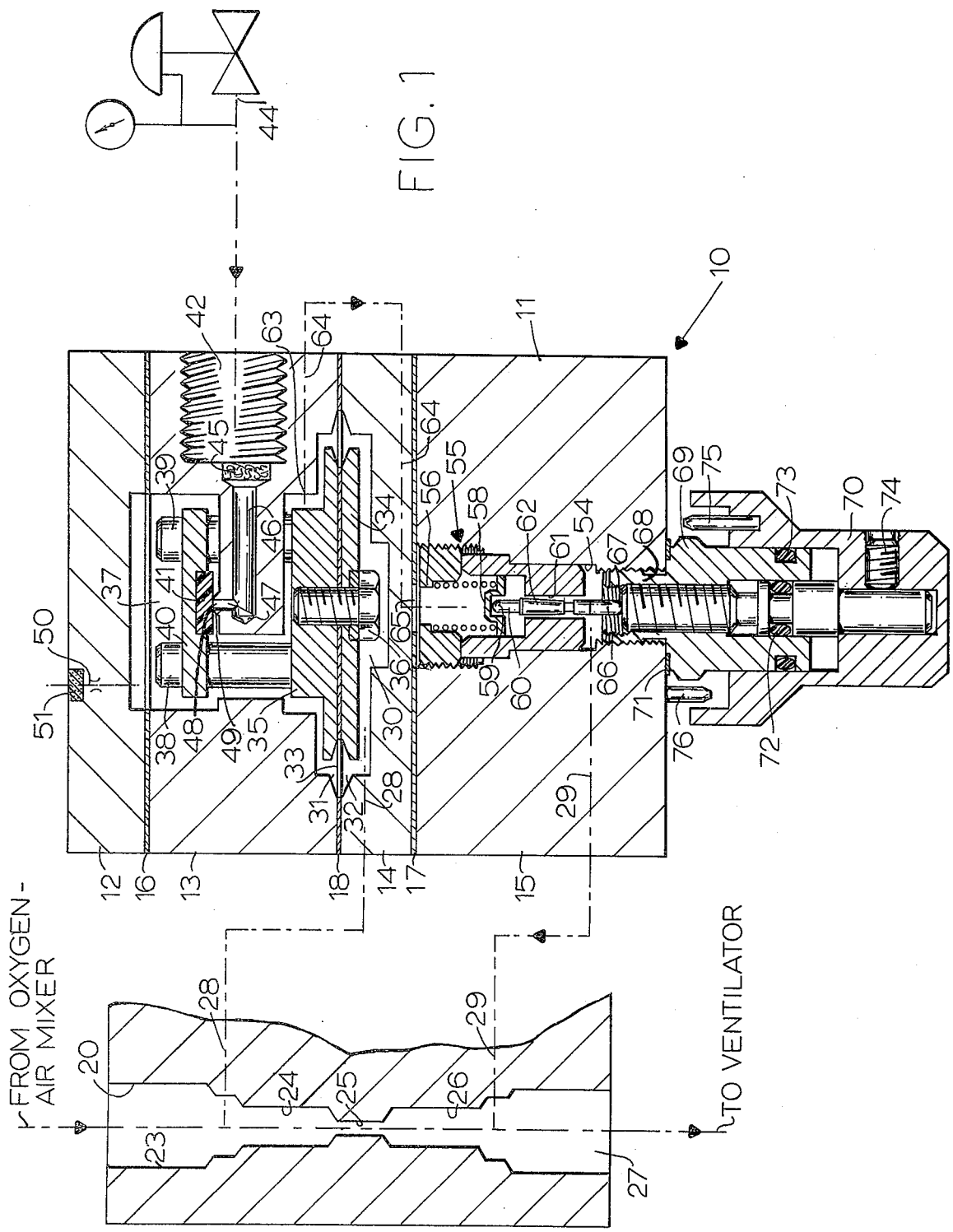
FIG. 1 is a somewhat diagrammatic view in elevation and in section but partially unfolded, of a gas ratio controller incorporating the principles of the invention.

Apparatus embodying the invention may be provided as a single unit 10 having a housing or body 11 made up of several pieces 12, 13, 14, and 15 suitably drilled or bored or otherwise shaped to provide the necessary structure, held together by suitable screws (not shown), and suitably sealed by gaskets 16 and 17, with a diaphragm 18 between the body members 13 and 14. Through the housing 11 extends a conduit 20 provided within inlet fitting 21 (FIG. 2) that is attached to a supply of the main gas. For example, when the unit 10 is used in connection with a ventilator, the fitting 21 may be connected to an outlet of an oxygen controller to deliver a suitable mixture of oxygen and air, the percentage of oxygen in the mixture ranging between 21% and 100%. An outlet fitting 22 may then be connected to the ventilator.

The conduit 20 has an initial wide portion 23 which narrows down in a passage portion 24 to a fixed main orifice 25, where the cross-sectional area is quite narrow in comparison with the cross-sectional area of the initial portion 23. The purpose here is to create a pressure drop across the orifice 25. On the downstream side of the orifice 25 is another widening passage 26 corresponding to the passage 24 and beyond that the conduit 20 again assumes its full diameter in a downstream portion 27. The housing 11 is suitably bored to provide a passageway 28 leading from the main conduit 20 at a location upstream from the orifice 25 and is also bored to provide a passage 29 similarly connected to conduit 20 at a location downstream from the orifice 25.

The passageway 28 leads into a chamber 30 on one side of the diaphragm 18. The diaphragm 18 is made to be thin, very limp, and extremely flexible so that it will be very sensitive. It may be elastomer-coated fabric, typically about 0.008 inch thick. Such a diaphragm has substantially no spring rate; so its position is determined entirely by the gas pressures on its opposite sides. To accommodate such a flexible diaphragm 18 and give it proper support, the housing members 13 and 14 are provided with opposed annular recesses 31 and 32 which face each other and are sloped on both sides away from a circle to provide walls which support a flexing portion 33 of the diaphragm 18 in both of its extreme positions. The support prevents damage to the diaphragm 18 and also limits its movement. Also, a pair of diaphragm plates 34 and 35 are secured to the opposite sides of the central portion of the diaphragm 18 and are secured together by a suitable machine screw 36.

The housing member 14 is suitably recessed to provide the chamber 30 which is connected to the passage 28, and this chamber 30 is sealed to provide a dead end, having no outlet. The housing member 13 on the other side of the diaphragm 33 is recessed to provide a second chamber 37. In the preferred form of the invention shown in the drawings, this chamber 37 is much deeper than the sealed chamber 30 in order to accommodate a suitable valving arrangement for incoming secondary gas, such as carbon dioxide.

For this purpose, the diaphragm plate 35 in the chamber 37 has a pair of upstanding rodlike members 38 and 39 which serve as guides for a floating plate 40 that is provided with a suitable seal or elastomeric seating member 42. Also, the housing member 13 is provided with a threaded opening 42 that receives a suitable fitting 43 (FIG. 2) connected to a supply 44 of suitably regulated secondary gas, such as carbon dioxide. A suitable filter 45 eliminates particulate matter, and a radial passageway 46 extends in to an axial passageway 47 directly in line with the axis of the diaphragm 18. The passageway 47 terminates in an orifice 48, preferably having a raised outer wall 49 which goes down conically from an edge.

Preferably, the carbon dioxide (or other secondary gas) is admitted in such a way that, during operation, the seal 41 is never seated against the orifice 48. Partly for this purpose, the present invention preferably provides a small bleed conduit 50 which bleeds to atmosphere the gas from the chamber 37 at a slow rate, but sufficient to enable a rapid adjustment when the percentage of carbon dioxide is lowered during operation by a re-setting of the ratio device soon to be described. This bleed orifice 50 may be of a suitable size to provide for a bleed of about 200 milliters per minute of gas at a pressure of about 40 psi. It is preferably adjusted in the factory to achieve its desired rate. The bleed orifice 50 is preferably provided with a silencer 51, in order to avoid the hissing sound that the gas would otherwise make.

The carbon dioxide supply 44 can be any suitable source, such as a cylinder of the gas and at a consumption of one liter per minute, a size G cylinder of carbon dioxide, which holds 400 cubic feet of the gas, would last 180 hours. Similarly, a size E cylinder which contains 55 cubic feet would last about 24 hours. Suitable connection to a suitable pressure regulator is provided to give an intake level of about 60–80 psi.

The housing member 15 is bored, preferably axially in line with the diaphragm 18, to provide a stepped passage 54 for receiving a flow control valve. A valve body assembly 55 is provided with an annular rim 56 to seat a spring 57 which presses a spider-like spring retainer 58 against a rounded end 59 of a stem 60. The stem 60 extends through a cylindrical passageway 61 in the body 55 and the stem 60 is provided with a frustoconical portion 62 so that the farther the stem 60 is moved toward the diaphragm 18 the more open is the space between the stem 60 and the passageway 61 and therefore the larger the cross-sectioned area through which the gas will flow.

Figure 2:
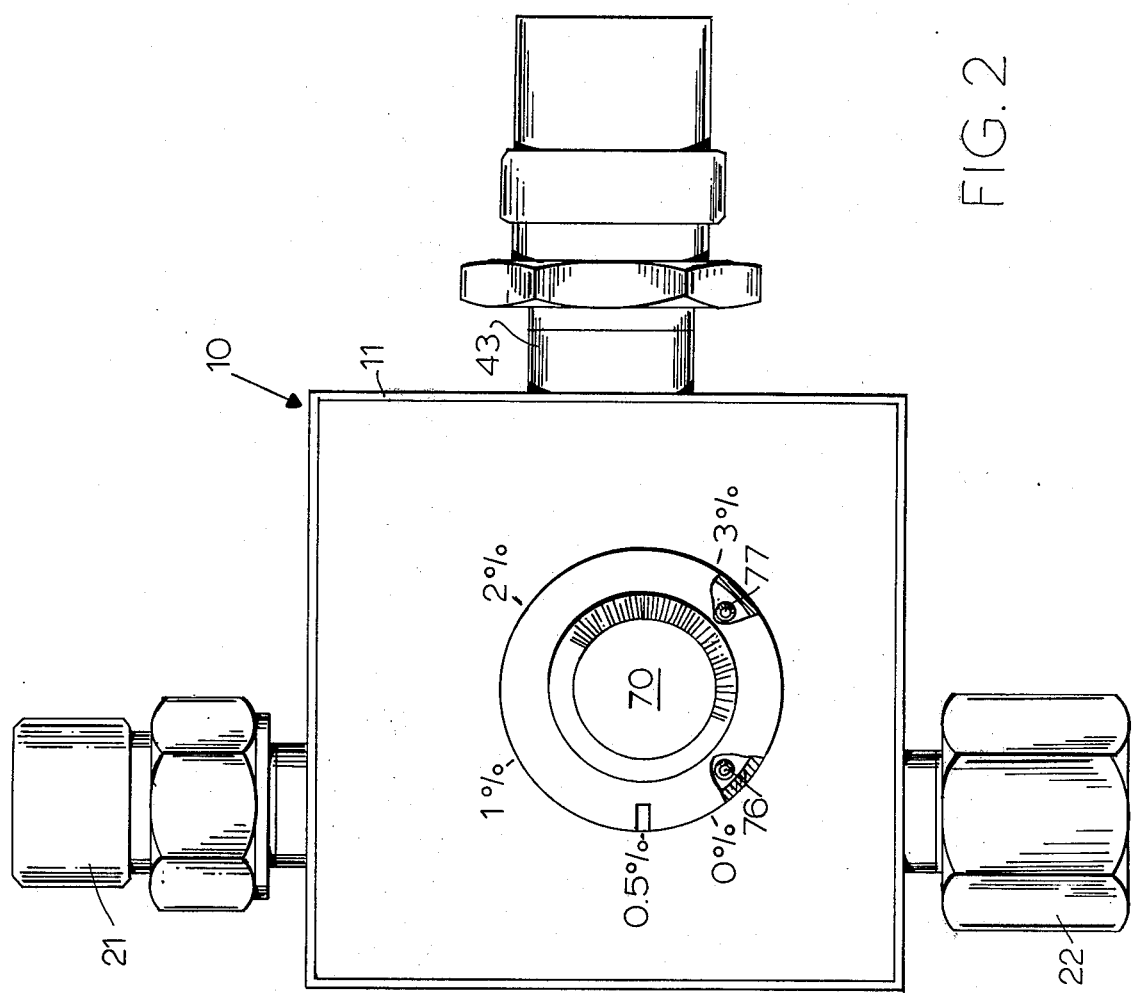
FIG. 2 is a view in front elevation of the device.

An outlet 63 from the chamber 37 is connected internally of the housing 11 by a passageway 64 (FIG. 1 for diagrammatic purposes has the broken line extend exterior of the housing but this is not the actual path) which leads axially through the gasket 17 to an inlet 65 for the passage 54. The stem 60 is elongated beyond the portion 62 and is provided with a rounded end 66 against which is urged the end 67 of an adjusting screw 68. The rounded ends 66 and 59 enable the stem 60 to operate with substantially no rotational effect, and this helps to minimize wear. The adjusting screw 68 may be mounted in a suitable threaded fitting 69 which is secured to the housing and to which is attached a suitable handle 70. A suitable gasket 71 prevents leaks, the screw 68 is also gasketed by an O-ring 72, and another O-ring 73 lies between the fitting 69 and the handle 70. The handle 70 may be secured to the screen 68 by a set screw 74. The handle 70 is provided with a stop pin 75, and the housing 11 may be provided with a pair of cooperating pins 76 and 77 for engaging the pin 75, one to limit the position of the screw 68 at each end of its range. At one end, the pin 76 may represent substantially zero flow and at the other end the pin 77 may represent the maximum flow, which for carbon dioxide in a ventilator would tend to be about 3% of the mixture. The device may be calibrated accordingly, as shown in FIG. 2.

The passage 29 leading to the downstream portion of the conduit 20 is connected to the passage 54 beyond the valve body 55 and provides the route by which the carbon dioxide, suitably regulated as to the pressure drop and suitably set by the stem as to its ratio to the principal gas, flows into the main conduit 20.

In operation, the main or breathing gas flows through the main conduit 20, and the diaphragm 18 senses the pressure of the main gas by means of the passageway 28 and the chamber 30 and equates to that pressure the pressure of the secondary gas or carbon dioxide which is to be supplied. Fluctuations in flow of the breathing gas will affect this pressure, and therefore the diaphragm 18 makes it possible for the flow of the carbon dioxide to vary with the flow of the breathing gas.

The ratio between the two gases is set by the handle 70, as indicated on a scale directly graduated in percent of the carbon dioxide in the mixture. As the breathing gas flows through the conduit 20, it creates a pressure drop across the fixed main orifice 25, and the diaphragm 18 is subjected on one side to the pressure on the upstream side of the orifice 25 and on the other side to the carbon dioxide pressure generated by the diaphragm plate 35, the seal 41, and the orifice 58. The seal 41 and the orifice 58 cooperate to vary the carbon dioxide supplied in accordance with the variation of flow of the breathing gas, for the diaphragm 18 senses any difference between the two pressures and regulates automatically the flow of carbon dioxide so that the carbon dioxide pressure is maintained at all times equal to the pressure upstream of the main orifice 25. The sensitivity of the diaphragm 25 makes this variation substantially instantaneous.

Through this automatic operation an identical differential pressure then exists across the main orifice 25 and across the metering valve body 55, since the inlets of both are at the same pressure and the outlets of both are at the same pressure. The ratio of the two flows is then determined simply by the ratios of the orifice areas, which are determined by the fixed orifice 25 on the one hand and, on the other hand, by the variable orifice between the members 61 and 62, controlled by the adjusting handle 70. Sensitive adjustments can be made, and when the percentage of carbon dioxide is to be reduced, the bleed orifice 50 helps to achieve rapid equilibration, whereas without the bleed orifice 50 it might take some time to do that.

In a typical application, the output flow is sent to a ventilator at a nominal pressure of about 40 psi and the flow may vary from about 10 liters to 60 liters per minute. Carbon dioxide is adjustable to provide from zero to 3% of the mixture constituting this flow.

Instead of being connected to the inlet of a ventilator, this ratio controller may be connected to the outlet of a flow meter assembly incorporated in the ventilator oxygen controller and breathing gas is then sent as a mixture directly to a mask at atmospheric level.

To those skilled in the art to which this invention relates, many changes in construction and widely differing embodiments and applications of the invention will suggest themselves without departing from the spirit and scope of the invention. The disclosures and the description herein are pruely illustrative and are not intended to be in any sense limiting.

I claim:

1. Apparatus for controlling the flow ratio of two gases, each having a separate supply, a first gas being subject to flow fluctuations and a second gas being added to said first gas in a smaller volume than said first gas and at a constant ratio thereto, said ratio being adjustable, said apparatus including in combination:
   a conduit for said first gas having a fixed orifice which is small in cross section relative to the remainder of said conduit,
   a pressure regulator having a diaphragm defining two chambers, a first dead-end chamber connected to said conduit upstream from said orifice and at the same pressure, and a second chamber having an inlet valve controlled by said diaphragm and connected to the supply for said second gas and also having an outlet for said second gas at a flow pressure-regulated to have the same pressure at the outlet as that of said first gas in said first chamber,
   a flow control valve having an inlet connected to the outlet from said second chamber and an outlet connected to said conduit downstream from said orifice and having in between its said inlet and outlet a cylindrical passage and a tapered frustoconical metering stem movable relatively to said passage, said stem being biased by a biasing spring bearing against a spring-carried movable plate, said stem having a rounded end providing point contact with said plate, the opposite end of said stem also having a rounded end to provide a point of contact, and
   adjustment means for said flow control valve for manually setting the position of said stem relatively to said passage, said adjustment means comprising an adjustment screw having an end in point contact with said opposite end of said stem.

2. The apparatus of claim 1 wherein said second chamber is provided with a bleed orifice for slowly bleeding gas from said chamber to the atmosphere, thereby enabling rapid adjustment of said ratio when said ratio is being adjusted downwardly.

3. The apparatus of claim 1 wherein said diaphragm is extremely flexible having substantially no spring effect and having its position determined substantially solely by the pressures operating on its opposite faces, and wherein said diaphragm has a circular rim anchored between two annular housing portions and said diaphragm lies between a pair of diaphragm plates, each diaphragm plate having an outwardly extending face sloping away from said diaphragm and each said annular housing portion having an inwardly extending face sloping away from said diaphragm, to support said diaphragm in each of its extreme positions, limit its movement and prevent damage to it.

4. The apparatus of claim 1 wherein said tapered metering stem is frustoconical and said passage is cylindrical, having slightly larger diameter than the largest part of said stem.

5. Apparatus for controlling the flow ratio of two gases, each having a separate supply, a first gas being subject to flow fluctuations and a second gas being added to said first gas in a smaller volume than said first gas at a constant ratio thereto, said ratio being adjustable, said apparatus including in combination:

a conduit for said first gas having a fixed orifice which is small in cross section relative to the remainder of said conduit, a pressure regulator having a diaphragm defining two chambers, a first dead-end chamber connected to said conduit upstream from said orifice, and a second chamber having an inlet valve controlled by said diaphragm and connected to the supply for said second gas and also having an outlet for said second gas at a pressure regulated flow with the pressure of said second gas at the outlet being equal to that of said first gas in said first chamber, said diaphragm lying between a pair of diaphragm plates, the diaphragm plate in said second chamber having thereon a pair of projecting rod members, said rod members carrying and guiding a plate having an elastomeric sealing member thereon, said apparatus having an a passageway extending into said second chamber and exiting via an orifice opposite said sealing member so that the entry of gas is controlled by the sealing member and the orifice, said orifice lying directly axially in line with the axis of said diaphragm, said diaphragm being extremely flexible, having substantially no spring effect and having its position determined substantially solely by the pressures operating on its opposite faces, said second chamber having a bleed orifice for slowly bleeding gas from said chamber to the atmosphere thereby enabling rapid adjustment of said ratio when said ratio is being adjusted downwardly, a flow control valve having an inlet connected to the outlet from said second chamber and an outlet connected to said conduit downstream from said orifice and having in between its said inlet and outlet a cylindrical passage and a tapered metering stem movable relatively to said passage and smaller in diameter than said passage, a biasing spring, and a spring-carried movable plate, said stem having a rounded end providing point contact thereat and being biased by said spring, the opposite end of said stem also having a rounded end to provide a point of contact, and adjustment means for said flow control valve for manually setting the position of said metering stem relatively to said passage, said adjustment means comprising an adjustment screw in point contact with said opposite end of said stem.

* * * * *